United States Patent Office 2,981,655
Patented Apr. 25, 1961

2,981,655
PRODUCTS HAVING JUVENILE HORMONAL ACTIVITY AND THEIR PRODUCTION

Carroll M. Williams, The Biological Labs., Harvard University, Cambridge, Mass.

No Drawing. Filed Dec. 12, 1956, Ser. No. 627,744

9 Claims. (Cl. 167—22)

This invention relates to products and compositions exhibiting juvenile hormonal activity, methods of producing such products and compositions, methods of utilizing such products and compositions, production of insecticides from such products and compositions and their utilization.

The corpora allata have been known to exhibit juvenile hormonal activity which opposes or prevents the metamorphosis of immature insects. The activity has been ascertained by parabiosis and the transplantation of living corpora allata. Any substance itself exhibiting such hormonal activity has not, insofar as known, been extracted or obtained apart from the living insect or endocrine organ.

Among the objects of the present invention are products and compositions apart from corpora allata which exhibit juvenile hormonal activity and the production, separation, and utilization of such products and compositions.

Further objects include such products and compositions which exhibit insecticidal action, and the production and utilization of hormonal insecticidal products and compositions.

Further objects and advantages of the present invention will appear from the more detailed description set forth below, it being understood that such more detailed description is given by way of illustration and explanation only, and not by way of limitation, since various changes therein may be made by those skilled in the art without departing from the scope and spirit of the present invention.

In accordance with the present invention, products and compositions which exhibit juvenile hormone activity are obtained as by extraction or elution of abdominal tissues of adult male moths which contain juvenile hormone derivatives in extractable condition, for example Cecropia moths. This was a surprising and unexpected result since only a trace of material exhibiting such activity was obtainable from the heads and thoraces of male Cecropia moths even though the corpora allata are located in the head; and further it has not as yet proved possible to extract any such hormonally active substance from the abdomens of female Cecropia moths or from any part of male or female Polyphemus moths. Yet investigation of the Cecropia silkworm (*Platysamia cecropia* L.) has revealed a rich depot of material exhibiting corpus allatum hormonal activity in the abdomen of the adult male of this moth. This same result has been duplicated making use of the related species *Samia walkeri* F. & F.

In its native state within the insect the factor which exhibits juvenile hormone activity is apparently in combination with a protein; that is, it is present in a lipoprotein complex. The contribution which the protein part makes to the hormonal activity is not fully understood. However, it seems to be the rule that most small molecules, such, for example, as the sterol hormones of mammals, combine with a protein before exerting their effects. Within the animal itself, the protein part almost always pre-exists in excess. When secreted by the corpora allata within the living insect, the small, heat-stable molecule becomes the catalytic center of the lipoprotein complex, which latter apparently corresponds to the juvenile hormone per se.

The extraction procedure is designed to detach the small molecule from the hormonal complex, and to obtain this biologically active derivative of the juvenile hormone apart from the living insect. Since the molecule in question has the properties of a lipoid, the lower aliphatic alcohols, for example, are suitable for the extraction. They serve (1) to denature the protein; (2) to detach the small molecular entity; and (3) to take the latter into solution.

Organic solvents that denature the protein, such as methanol, ethanol, ethyl ether or petroleum ether, are suitable for this purpose. Mixtures of the solvents may be used. The solvent of choice seems to be a 1:3 mixture by volume of ethanol and ethyl ether. The character of the oily vehicle which one simultaneously extracts along with the active principle is conditioned by the solvent system that is used. Methanolic extraction gives a very scant volume of highly viscous yellow oil. Ethanol, ether, or ethanol-ether give considerable volume of low viscosity oil (up to 0.5 ml. from each adult abdomen). All these active oils are golden yellow in color.

A number of other solvent systems have been tested and found inadequate. The active principle resists extraction when the fresh insect is extracted at room temperature in acetone, chloroform, benzene or carbon tetrachloride. These solvents are poor denaturers of protein and, evidently, fail to detach the active principle from its protein carrier. This inference is confirmed by the fact that the active principle is soluble in all these solvents once it has been extracted with methanol, ethanol or ethyl ether.

The active principle is readily extractable from the adult abdomens of the male Cecropia moth. The procedure may be as follows:

The fresh adult abdomens are cut off with scissors, cut longitudinally into several fragments, and accumulated in a stoppered flask of solvent. The material may be stored indefinitely at room temperature in this state. The extraction can be performed immediately or weeks or months later. It has been possible to extract the biologically-active principle, or a derivative thereof, from material preserved in ethanol eight years ago.

The extraction desirably proceeds as follows. The abdomens are placed in a Waring Blendor and blended with the initial solvent. The suspension is then centrifuged, the solvent decanted, and the sediments resuspended. This procedure is then repeated again. In this manner one collects a considerable volume of solvent (now colored yellow with the extracted material). The solvent fractions are combined and filtered. In a small scale operation, the filtered solvent may then be placed in an open beaker in a boiling water bath and the solvent evaporated. In larger scale operations, the solvent may be distilled off, using a steam bath in a partially evacuated system.

The end product, in any case, is a golden-yellow non-toxic oil which shows very considerable hormonal activity when tested. The amount of active principle liberated from a single abdomen is sufficient to give a positive reaction in ten other animals of the same species. This is a very remarkable aspect of the matter, since one would have predicted that at least 100 abdomens would be necessary to give enough hormonal activity for one positive test. Indeed, the finding is virtually without parallel in endocrinological work. This fact, in itself, suggests that the crude extract contains a substantial concentration of the active material.

How much is actually present may be gauged on the supposition that the material is active in the same concentration range as the insect "growth hormone"—the active principle of which has now been crystallized. For growth hormone, a positive test requires the injection of approximately 0.01 mg. If a positive test for derivative of juvenile hormone requires 0.01 mg., and if each abdomen yields an amount of active material for ten positive tests, then the extract of each abdomen would contain 0.1 mg. Thus, from only 100 abdomens, one should obtain upwards of 10 mg. of the pure substance—a surprising yield.

This calculation gives some insight into the possible concentration of the derivative of juvenile hormone in the initial crude extract as it is obtained by appropriate treatment of the insect. If the extract from a single abdomen has volume of 0.3 ml. (on the average) and if this volume contains 0.1 mg. of active material, then the percentage of the crude extract which is hormonally active is, on a weight basis, approximately 0.03%. According to this estimate, about 99.97% of the initial extract is the oily vehicle that travels along with the active principle. The considerable biological activity already demonstrated for such a "dilute" preparation is noteworthy.

It was demonstrated, that the active material is an extremely stable material. The substance is insoluble in distilled water, and at all stages in extraction may be washed repeatedly with water without loss of activity. It withstands prolonged exposure to 100° centigrade, and is very stable under storage at room temperature. It is not affected by treatment with aqueous solutions of 5 N alkali or 0.2 N acid at room temperature, or by anionic or cationic exchange resins. Evidently, it is a neutral molecule. It is not damaged by storage in an atmosphere of pure oxygen or by the addition of mild reducing agents such as sodium hydrosulfite. However, it is destroyed by strong oxidizing agents (alkaline hydrogen peroxide) or strong reducing agents (hydrogen and platinum black). It is not damaged by vigorous acetylation procedures. Mild saponification does not damage the molecule, while vigorous saponification at high temperatures destroys the activity.

In summary, it may be noted that the biologically active derivative of the juvenile hormone belongs to the general class of lipids. It is soluble in organic solvents, insoluble in water, very stable at room temperature, and resistant to exposure to 100° C. It is non-saponifiable and survives a half hour boiling in 0.5 M KOH (made up in 90% ethanol). It appears to be neutral, uncharged and a fairly small molecule. The active material is probably a sterol.

When injected into Polyphemus pupae weighing 5 gm., 0.025 ml. of the oil gives a clear-cut effect as explained below. Potent extracts prepared as explained herein, when injected into previously chilled pupae of *Platysamia cecropia* or *Telea polyphemus*, duplicate the results obtained by the implantation of living, active corpora allata; that is, the formation of the adult moth is blocked and the pupa is forced to transform into a second pupa. The extracts from Cecropia have been found active when tested on other Lepidoptera, e.g. *Pieris brassicae;* Coleoptera, e.g. *Tenebrio molitor;* Hemiptera, e.g. *Rhodnius prolixus;* and Blattaria e.g. *Periplaneta americana.*

Endocrine studies making use of the extract have revealed that the hormonal derivative is inactive when injected into isolated pupal abdomens or into other preparations where the "growth hormone" (prothoracic gland hormone) is absent. Extracts showing juvenile hormonal activity intervene in reactions to the growth hormone which occur early in adult development; that is, during the first few days of the twenty-one days required for adult development at 25° C. In the pupal-adult development of Cecropia or Polyphemus, they are without effect when injected after the fourth day of development at 25° C.

Methods of application of substances which exhibit juvenile hormone activity include the following.

A. *By parabiosis*

If one joins a previously chilled pupa of the Cecropia or Polyphemus silkworm to the abdomen of an adult male Cecropia moth, the combination survives for several weeks thereafter. Meanwhile, the pupa is thereby caused to share its blood continuously with that of the adult abdomen. When the pupal partner begins to develop, it transforms, not into a normal adult moth, but into a creature which preserves many pupal features. This method of "application" of the hormone continues to be useful for various purposes. For example, it permits one to test whether a particular adult insect contains the hormone. It permits, in brief, a rapid "screening" of various species, even when the latter are available as one or two specimens.

B. *By injection*

The active oil as obtained by any of the methods set forth herein, is drawn into a Burroughs-Wellcome microinjection syringe equipped with a 27 or 30 gauge needle. The needle is inserted into the test insect and a measured volume of extract injected. This dose, in silkworm material, is usually varied between .01 and .10 ml. Routinely the test insect consists of previously chilled pupae of the Polyphemus silkworm (*Telea polyphemus*) weighing three to six grams.

The effects of the injection may become apparent after a week or ten days. Final judgment, however, is postponed until the test animal completes its development. The insect is then carefully examined in terms of the degree to which the pupal characteristics are preserved.

The activity of the injection is scored on a graded scale from zero (no effect) to five (complete inhibition of adult characteristics). By this biological test one can determine the biological activity of each extract and track the increasing activity during its purification.

The oil-like characteristic of the extract commonly disappears when crude extract is fractionated. One gets solid or semi-solid materials. Hitherto, it has been necessary to test such fractions by implanting them in insects. It has been found that highly purified hydrocarbons, such as cyclohexane, heptane and cyclo-octane, are non-toxic for the test insect and are excellent solvents for the active principle. All fractions can now be tested by injection after dissolving them in one of these solvents. The solvents in question are volatile, and over a period of several days, are lost from the insect, leaving behind in the insect a definite amount of the test material.

C. *By topical application*

0.01 to 0.05 ml. of the oil is measured into the bottom of a glass vial. A test insect is then placed into the vial so that the tip of its abdomen is continuously in contact with the oil. The insect proceeds to develop in this situation. The effect of the treatment is scored in the same manner as in the case of injected animals.

Compositions containing a carrier and a substance having hormonal activity have proved topically important for various purposes. Thus the hormonally active extracted material has been found to exhibit insecticidal properties. Thus, for example, extracts prepared from petroleum ether were found active when applied topically to the outside of the pupal cuticle at the tip of the abdomen, e.g. of a pupa of *Telea polyphemus*, by method C described above. These investigations involving topical application are of special interest because they demonstrate that the substance exhibiting hormonal activity may penetrate the unbroken "skin" of the insect. Moreover, insects receiving a small amount of such substance in this manner develop into non-viable animals in which some parts undergo metamorphosis and other parts do not. Consequently, the insect rapidly dies without completing its metamorphosis.

The effectiveness of insecticides depends on their ability to penetrate to some point subject to the action sought. Since terrestrial insects have a hydrophobic cuticle which at the same time is lipophilic, a consideration of these factors will enable increase in toxic effectiveness including the time factor involved and in other ways. In general the most effective contact poisons are soluble in lipid solvents, and this is so in the present case.

The ability of the insecticidal composition to reach or penetrate to the focal point or area of its action is important. The petroleum ether extracts in conjunction with the yellow oils obtained from such extracts have been found to be quite active as insecticides. The oily vehicle promotes the penetration of unbroken skin by the hormonal material. In situations where the solvent employed to make the extract does not give a composition that shows penetrating properties to the degree desired, penetrating oil obtained with the petroleum ether extracts or in any other way may be added, or other penetrating agents may be used. For example, an extract obtained by using ethyl ether-ethanol (3:1) fails to get through the skin. But addition of an excess of light mineral oil gives penetration. Thus 0.01 ml. of active extract prepared from 3:1 ethyl ether-ethanol diluted with 0.25 ml. of mineral oil, is effective. The latter is placed in a vial and a pupa added so that the tip of its abdomen is in contact with same. The hormone gets in and 3+ reaction for the hormone is obtained throughout the insect. Attention is also directed to the low dose of hormone that is effective. 0.01 ml. of extract is about the lowest dose that works by injection. The same amount topically applied in the mineral oil works equally well.

Petroleum derived oils of high solubility and low volatility and low viscosity are very effective penetrating agents. Thus a petroleum oil of a boiling range between 100 and 150° C. penetrates more rapidly than a refined kerosene of boiling range of 200 to 255° C. Kerosene, though commonly not as penetrating as lighter fractions, frequently exhibits an added function in that it may alter the structure of the insect cuticle so that a polar compound of no pronounced penetrating property, such as ethyl alcohol, will penetrate rapidly. In this way compound solvents can be used to control penetration characteristics. Kerosene will aid the penetration of alcohols generally, as well as ketones, fatty acids, amines and phenols.

Among the paraffins, the best carriers are in the range of hexane to dodecane. Cycloparaffins such as cyclohexane and methyl cyclohexane, and also their alcohols such as methyl cyclohexanol may be used. The latter is as effective as kerosene, whereas benzene, toluene and xylene are inferior. But cresols and xylenols are effective spreading agents.

Vegetable oils such as sesame oil commonly employed as carriers for insecticides do not give the same penetration effects as do the mineral oils. And hence for insecticides that require the property of penetration through the cuticle, mineral oils are desirably employed.

The application of derivatives of insect hormones as insecticides is of fundamental importance and marks a new era. It is worthy of especial note because insects can scarcely evolve a "resistance" to derivatives of their own hormones, whereas they commonly do so in the case of conventional insecticides such as D.D.T. Accordingly, insects may be controlled by insecticides utilizing derivatives of their own hormones and hormonal active extracts, and by structurally related synthetic molecules with equivalent biological action.

For insecticidal use, application of the substance with hormonal activity may be carried out in any desired way. While the substance may be applied by direct contact of the substance with the insect, as illustrated above, it is desirable to utilize the active hormonal substance in or on a carrier since only very small concentrations are necessary. In fact, there is no lower concentration to the amount to be employed, since any amount will have some effect. Upper limits are usually only a matter of economy. A fraction of a percent by weight is generally sufficient.

A convenient method of application is by solution of the hormonal substance in a liquid organic solvent, such as for example any of the solvents thereof referred to above, or mixtures thereof. A solution in organic solvent of crude substance showing juvenile hormonal activity is an amount of 10 percent to 20 percent by weight of the final solution is satisfactory. As exemplary of such insecticides there may be mentioned that a petroleum ether solution of 20 percent of the cuticle-penetrating yellow-oil substance, identified above, or a 10 percent solution of the said yellow oil in 95 percent light mineral oil are effective insecticides. They may be applied for example, by spraying.

The hormonal insecticides may be conveniently applied by aerosol techniques. Such aerosols may be produced in the usual way by extremely rapid volatilization of a compressed and liquified gas to which has been added any desired proportion such as 10 to 20% by weight of an organic liquid solvent solution of the hormonal insecticide. The gases used may for example be dichlorodifluoromethane ("Freon") or methyl chloride. Various oils such as sesame oil and heavy petroleum oils, e.g. lube oils, and "Velsicol" type solvents may be used as solvent or vehicle. Mixed solvents such as acetone and methyl chloride, in equal parts or kerosene-acetone may be used. It is not absolutely essential that the hormonal insecticidal material be in complete solution in the vehicle since desired distribution will be obtained in any case. Examples of such aerosols are a "Freon" propellant carrying 10 percent by weight of a petroleum ether solution of juvenile hormonal active yellow oil produced as above, the latter constituting 10 percent by weight of the ether solution. Other solvents may be substituted for the petroleum ether, other propellants for the "Freon" and other hormonal insecticides for the yellow oil component, in this example.

As such other insect hormonal insecticides there may be mentioned biologically active derivatives of the "brain hormone," secreted by the brain, and the "growth hormone" secreted by the prothoracic glands. This latter active principle, for example, has been extracted from the pupa of the commercial silkworm *Bombyx mori* and isolated in crystalline condition. This molecule (termed "ecdysone") has the empirical formula $C_{18}H_{30}O_4$. Both the crude hormonal extracts and derivatives, as well as the crystalline material, may be used for insecticidal purposes.

In including reference to all of these insect hormones or substances exhibiting such insect hormonal activity, it is not intended to suggest that they are equivalents of one another, since they are essentially different substances. All such insect hormonal substances may be used as insecticides as long as they can get into the insect either by themselves or preferably with a carrier as explained herein, by penetration of the unbroken skin ("contact insecticide") or after being fed ("stomach insecticide"). The nature of insect growth is such that the cuticle must be shed or "molted" recurrently—a delicate procedure which is under the control of the three hormones mentioned above. Even more delicate is the period of metamorphosis when there must be a precise balance in all three hormones; i.e., the brain hormone and growth hormone must be present in proper concentration, while the juvenile hormone must be absent. An extrinsic supply of hormonally active agents can easily upset these delicate balances by disturbing the developmental reactions. Even a minor disturbance leads to death, because the insect is unable to molt its own cuticle successfully.

In all these cases of the use of insect hormones and derivatives for insecticidal purposes, the substances in question are almost surely active on insects only, and, perhaps, close relatives of insects. And as pointed out herein with respect to derivatives of the juvenile hormone, it is unlikely that the insect can evolve an effective defense against its own hormones and derivatives thereof. Any of the substances exhibiting hormonal activity can be substituted for corresponding amounts of the juvenile hormone derivative in any of the insecticidal compositions described herein including the operating examples, etc. And this is true, not only as to the extracts or eluates which show one or more of these hormonal activities but also the modified derivatives and synthetic products showing any such activities.

The hormonal insecticides may be applied as dusts on any desired pulverulent solid commonly used carrier such as talc, pyrophyllite, diatomite, gypsum, clays, such as bentonite, etc. Powdered substances which are useful as insecticides themselves may be used as carriers such as cryolite, sulphur etc., thus giving a combined effect. Finely ground dusts such as of silica or alumina may be used of particle size 15μ or smaller to get the insecticidal effect of such materials. The amount of hormonal insecticide may be the same percentage by weight in any such compositions as the amounts given for spray solutions above. Insofar as the amount of dust applied is concerned, it is comparatively unimportant, in view of the effective activity of such hormonal dusts. The dusts may be prepared by impregnation of any desired carrier as set forth above, with any of hormonal insecticides such as those described herein. The ratio of solution used to carrier will depend on the concentration of effective agent desired. The solvent need not necessarily be evaporated from the impregnated material, depending on its volatility, or conditions of storage or use. Examples of dusts include powdered talc or pyrophyllite carrying 10 percent by weight of hormonal yellow oil described herein. On the basis given above, one may calculate that on a weight basis, the concentration of active hormonally active principle in such crude solutions and dispersions need not exceed 10 percent, and frequently can be varied between .005 and 0.010 percent without loss of effectiveness.

In view of the stability of the hormonal substances to water, aqueous vehicles may be used particularly in producing suspensions, emulsions and dispersions of hormonal insecticidal components. Any vehicle may be employed as commonly used for such purposes with other types of insecticides. The resistance of hormonal substances to alkali and acids makes them particularly useful in dispersion, etc. in aqueous vehicles. Alkaline compositions are frequently more effective than acid compositions. The surface detergent type agent used in producing the aqueous dispersion may vary widely and includes soaps, saponins and synthetic detergents which may act as wetting agents or spreaders include the cationics such as fatty acylamides, sulfonamides, tertiary amino alcohol esters, etc.; anionic, such as sulphuric esters, alkane sulfonates, alkyl aromatic sulfonates, etc. including "Dreft," "Santomerses," etc.; and non-ionic types such as the polyoxyalkylenes and their esters, including "Spans," "Tweens," "Tritons" etc. A specific detergents include sodium oleate, sodium alkyl sulfonates, sodium salts of petroleum sulfonic acids, etc. These detergents may be used in usual amounts as for example from 0.25 to 1%, 2%, etc. by weight of the composition.

Any of the solutions of hormonal insecticides in organic solvent vehicles as illustrated above may be dispersed in an aqueous vehicle carrying a dispersing agent. For example a petroleum ether or acetone solution of yellow oil containing a fraction of a percent of yellow oil hormonal substance as described above may be dispersed in an aqueous soap emulsion, there being 10% of the ether or acetone solution by weight on the weight of aqueous medium.

Topical applications may be utilized in the form of creams and lotions. Exemplary creams include the following cream bases.

A

| | | |
|---|---|---|
| Almond oil | ml | 550 |
| White wax | gms | 150 |
| Borax | gms | 10 |
| Water | ml | 290 |
| Rose otto | ml | 5 |

B

| | | |
|---|---|---|
| Peach kernel oil | ml | 600 |
| Spermaceti | gms | 20 |
| White wax | gms | 160 |
| Borax | gms | 5 |
| Triple rose water | ml | 215 |
| Phenyl ethyl alcohol | ml | 5 |
| 10% solution nonaldehyde | ml | 0.1 |

C

| | | |
|---|---|---|
| Almond oil | ml | 500 |
| Lanolin anhydrous | gms | 30 |
| Spermaceti | gms | 70 |
| White wax | gms | 100 |
| Water | ml | 200 |
| Pelargonium oil | ml | 10 |

Almond oil may be replaced by any other oil in about equal amounts, commonly used in coldcreams, particularly by a mineral oil of .860 specific gravity, such as liquid paraffin. Method of manufacture may be conventional. Thus when borax is used, melt wax on a water-bath, add the oil, and warm to 80° C. The aqueous portion including the borax is heated to 80° C. and stirred in slowly. The odor masking component is added when cool, and the cream may be potted liquid. Addition of an emulsifying agent commonly used in the art is desirable. The ingredients and proportions above set forth are exemplary of common practice and may vary widely. Any of these creams may be used as a carrier for any of the materials having juvenile hormone properties as set forth above.

Similarly, any of other skin creams and lotions known in the industry may be used as a carrier for juvenile hormonal substances. Thus creams may be used, made by melting stearic acid on a water bath to a temperature of about 85° C. Water with or without glycerine is heated to that temperature, alkali dissolved therein, the hot alkaline solution gradually poured into the liquid fat acid and brisk stirring applied at about 85° C. for about ten minutes after all of the hot alkali has been added. The cream thus obtained is removed from the heat and stirred until it sets, a temperature of about 20° C. desirably being a minimum. Odor-masking substances may be added.

A typical composition is

| | | |
|---|---|---|
| Stearic acid | gms | 200 |
| Curd soap | gms | 50 |
| Water | ml | 800 |

Any of the creams and lotions may be used as a carrier for the insecticidal hormonal materials as disclosed above. The amounts may be as small as given above for topical application but the amount of the hormone may be considerably greater, for example, up to 2% by weight of the composition, or even higher.

What I claim is:

1. The method of obtaining a juvenile hormone active substance which comprises eluting abdominal tissue of adult male Cecropia moths with a liquid saturated aliphatic alcohol solvent for said substance.

2. The method of claim 1 in which the solvent is petroleum ether.

3. The method of claim 1 in which the solvent is a liquid saturated aliphatic ether.

4. A juvenile hormone active extract substantially identical in juvenile hormone activity but in concentrated form, with that obtained by solvent extraction of abdominal tissues of adult males of *Platysamia cecropia* L. and *Samia walkeri* F. & F., said solvent being selected from the group consisting of ether, petroleum ether, methanol and ethanol.

5. A topical composition containing a juvenile hormone active extract as set forth in claim 4 and an inert pesticidal adjuvant as a carrier therefor.

6. The composition of claim 5 in which the carrier is an aerosol.

7. The composition of claim 5 in which the carrier is a powdered solid.

8. The composition of claim 5 in which the carrier is an organic liquid solvent for the substance.

9. The composition of claim 5 in which the carrier is an aqueous dispersion.

No references cited.